Dec. 9, 1941.            W. E. HUFFMAN ET AL            2,265,168
                  HEATER, AUTOMOTIVE AND AIRCRAFT
                         Filed June 27, 1941

INVENTORS
WILLIAM E. HUFFMAN
OTTO MORGENSEN, JR.
BY
ATTORNEYS

Patented Dec. 9, 1941

2,265,168

UNITED STATES PATENT OFFICE 2,265,168

HEATER, AUTOMOTIVE AND AIRCRAFT

William E. Huffman and Otto Morgensen, Jr., Dayton, Ohio

Application June 27, 1941, Serial No. 400,055

6 Claims. (Cl. 237—2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a heating system adapted for use either in automobiles or aircraft and is particularly well suited for use in the latter.

Cabin heaters are essential in modern aircraft, either commercial or military, which are required to fly at high altitudes, or operate in cold weather, and such aircraft have generally employed vapor heating systems including a boiler associated with the exhaust manifold of the engine to receive heat therefrom, and delivering steam under pressure to radiators mounted within the cabin, the water vapor discharged from the radiators being condensed in suitable air-cooled condensers and returned to the boiler, or boilers, for recirculation. Vapor heating systems of this character have given a great deal of trouble from the service standpoint due to the fact that water is the only safe heat-transfer medium which can be employed and when the aircraft is on the ground for a protracted period of time during cold weather without the engines running, the water in the heating system will freeze unless drained therefrom, and hence has resulted in bursting pipes and the like when the ground crews have failed to remove the water from the heating system. Vapor heating systems also have the disadvantage of greatly added weight which is very undesirable in aircraft installations.

Heating systems employing air heated by the engine exhaust gases as a heat-transfer medium, or using exhaust gases from the engine directly as a heating medium have many advantages from a service and weight standpoint over vapor heating systems, but suffer from the disadvantage that carbon monoxide from the exhaust gases is liable to escape from the heating system into the cabin of the aircraft, or into the closed body of an automobile as the case might be and thereby cause the death of the occupants. Such hot-air heating systems, though formerly employed in the automotive field, have practically disappeared in later years due to the dangers of carbon monoxide poisoning despite their inherent advantages from the standpoint of simplicity of construction and reliability in operation.

The present invention employs air heated by the exhaust manifold of the engine as a heat-transfer medium to heat the interior of an automotive vehicle or an aircraft cabin, and overcomes the difficulties encountered in previous heating systems of this character by employing positive safeguards against any possible contamination of the air within the vehicle from carbon monoxide or other poisonous gases present in the engine exhaust system. In accordance with the present invention the possibility of leakage of carbon monoxide from the engine exhaust system into the heating system is prevented by maintaining the absolute pressure, within that portion of the heating system in contact with the exhaust gases, greater than the absolute pressure within the exhaust manifold at any part thereof adjacent the portions of the heating system contacted by the exhaust gases. By this provision if any leak occurs in the heating system which would tend to permit the entrance of poisonous gases from the exhaust system into the heating system, the greater pressure of the air within the heating system tends to cause leakage in a reverse direction, i. e. the leakage will occur from the heating system to the exhaust manifold rather than in the reverse direction, and thus poisonous gases are prevented from entering the heating system. The pressure within those portions of the heating system in contact with the exhaust gases is maintained by means of a blower, the output pressure of which is controlled by a pressure-responsive valve, so that the pressure within the aforementioned portions of the heating system are always greater than pressure in the exhaust system within the region thereof occupied by the heat exchanger in contact with the exhaust gases and the control valve is operative to cut off all flow through the heating system in the event of any serious leakage within the portion thereof contacted by the heated exhaust gases.

It is, therefore, an object of this invention to provide a heating system for automotive vehicles in which air is passed in heat exchange relation to the exhaust gases passing through the vehicle engine exhaust system and utilizing the heated air in a heat exchanger to heat the interior of the vehicle, the pressure of the air within that portion of the heating system in contact with the exhaust gases being maintained at a pressure greater than the pressure within that portion of the exhaust system occupied by the air-heating means.

It is a further object of the invention to provide a heating system for automotive vehicles, including aircraft, comprising in combination with an engine exhaust manifold, of a heat exchanger associated with the exhaust manifold so as to receive heat from the exhaust gases passing therethrough, the heat exchanger associated with the exhaust manifold being adapted to receive air under pressure at one end thereof and delivering the same to a second heat exchanger mounted within the vehicle compartment to be heated, and an automatic pressure-responsive control valve being arranged between the heat exchangers and operative to maintain the pressure within the first named heat exchanger at a value greater than the absolute pressure within these portions of the exhaust manifold adjacent thereto.

Other objects of the invention not specifically enumerated above will become apparent by reference to the detailed description in the specification and to the appended drawing in which.

Figure 1:
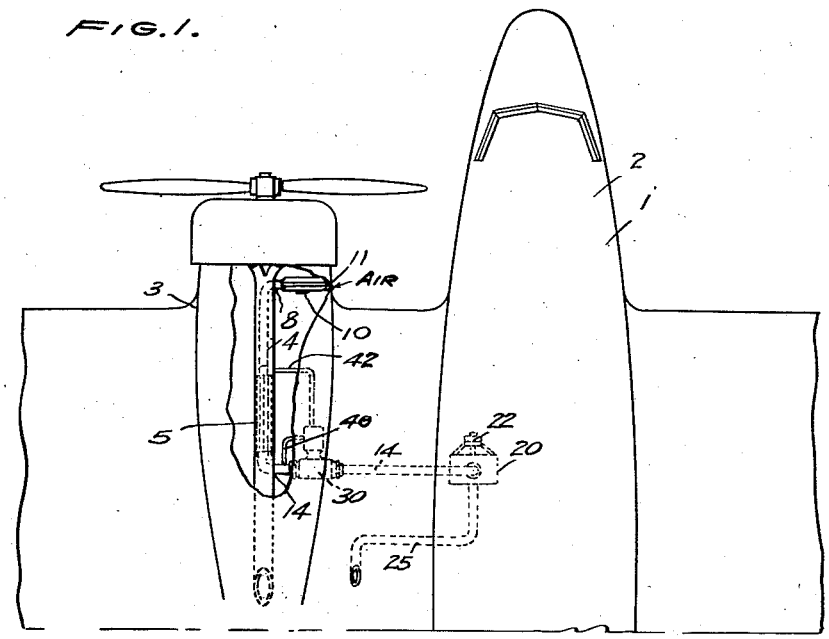
Fig. 1 is a diagrammatic view illustrating the installation of a heating system in accordance with the invention for heating the cabin of an aircraft.

Referring now to Fig. 1, the reference numeral 1 generally indicates an aircraft, for example of the bi-motor type, having a cabin interior 2 which it is desired to heat. As illustrated, the aircraft is provided with an engine nacelle 3 within which is mounted a propelling engine (not shown) provided with an exhaust manifold 4 within which is mounted a heat exchanger generally indicated by the reference numeral 5 and arranged to receive heat from the exhaust gases passed thereover. The heat exchanger 5 is connected by means of a conduit 8 to a small positive-pressure blower which may be driven directly from the aircraft engine, or by a separate power source such as an electric motor, the blower 10 being adapted to deliver air under pressure to the heat exchanger 5 and the air heated in the latter being forced through a conduit 14 under the control of an automatic pressure-control valve 30 to a second heat exchanger or radiator 20 mounted within the aircraft cabin 2 and adapted to heat the air within the cabin. Heated air rejected by the heat exchanger or radiator 20 is exhausted to the outer atmosphere through a conduit 25.

Figure 2:
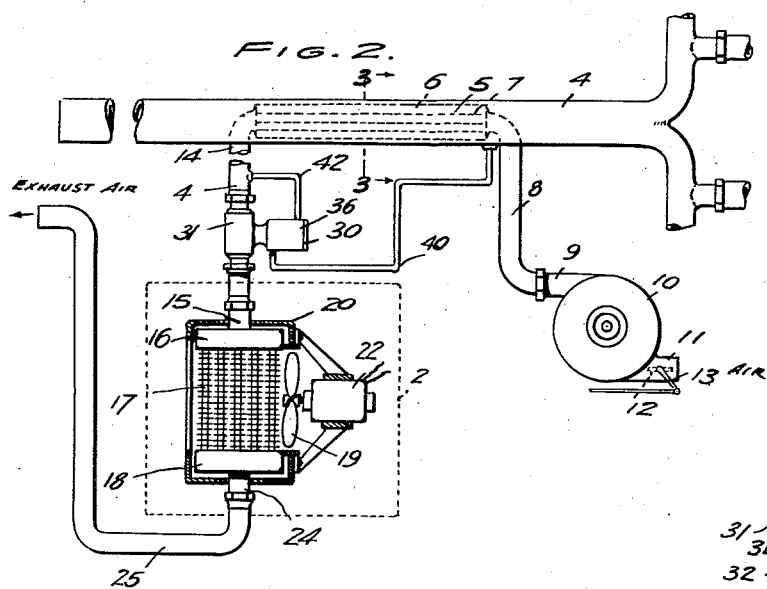
Fig. 2 is a diagrammatic view illustrating the principal components of a heating system in accordance with the invention.
Figure 3:
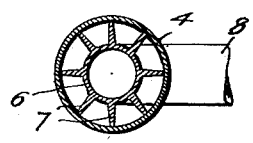
Fig. 3 is a sectional view taken on line 3—3 of Fig. 2, and illustrating the construction of the heat exchanger mounted within the engine exhaust manifold.

The heating system assembly illustrated in Fig. 1 and shown in detail in Fig. 2 will now be more specifically described. As noted in Fig. 2 the heat exchanger 5 comprises a tubular member 6 arranged coaxial within the main exhaust conduit 4 and is provided with exterior fins 7 (see Fig. 3) extending longitudinally within the manifold 4 and adapted to absorb heat from the exhaust gases passing thereover and thereby heat air passing through the heat exchanger conduit 6. The heat exchanger 5, as previously noted, is connected by means of conduit 8 to the outlet 9 of a positive-pressure blower 10, the latter being provided with an air inlet conduit 11 which is adapted to be controlled by means of a butterfly valve 12 manually actuated by means of a lever 13 through any suitable manual control means extending within the aircraft cabin or vehicle body. By means of the valve 12 the quantity of air passing through the heating system may be regulated and hence the heating conditions within the vehicle space to be heated may be controlled at will of the operator. The outlet of the heat exchanger 5 is connected by means of a conduit 14 to an inlet connection 15 of the upper header 16 of a second heat exchanger or radiator generally indicated by the reference numeral 20. A plurality of finned tubes 17 arranged in parallel connect the upper header 16 to a lower header 18 and heat from the air passing through the tubes 17 is radiated to the interior of the cabin 2 by means of a blower fan 19 arranged to circulate the air from the cabin interior over the heat exchanger tubes 17, the fan 19 being driven by an electric motor 22 energized by a power source such as a battery or generator carried by the vehicle. The lower header 18 is provided with an outlet connection 24 from which the discharge gases may pass into a discharge conduit 25 communicating with the outside atmosphere.

Figure 4:
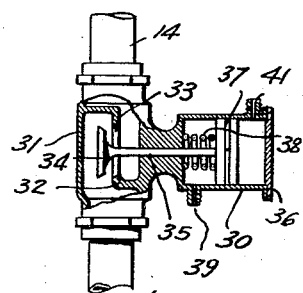
Fig. 4 is a view partly in section illustrating the details of the pressure-responsive control valve illustrated in Fig. 2.

A pressure-responsive control valve 30 is inserted in the conduit 14 between the outlet from the heat exchanger 5 and the inlet 15 of the heat exchanger 20 and, as seen in Fig. 4, comprises a housing 31 having a partition wall 32 formed therein, the wall being provided with a port 33. A poppet valve 34 is arranged to cooperate with a valve seat formed by the edges of the port 33 so that when the valve is lifted from its seat gases may flow from the heat exchanger 5 to the heat exchanger 20 (Fig. 2) through the port, and when the valve is closed all flow of gases through the heating system is prevented. The poppet valve 34 is provided with a valve stem 35 which extends into a cylinder 36, the latter being integrally formed with the valve casing 31. The cylinder 36 is closed at its outer end and has a piston 37 slidably mounted therein to which the outer end of the valve stem 35 is secured, the piston being urged in an outward direction by means of a light coil spring 38 which tends to urge the poppet valve 34 in the closing direction. The cylinder 36 is provided at its inner end with a passage 39 adapted to communicate with conduit 40, (Fig. 2) the other end of which is connected to the exhaust manifold 4 to transmit the pressure from within the manifold to the inner side of the piston 37. The cylinder 36 is also provided with a passage 41 adapted to be communicatively connected by means of a conduit 42 (Fig. 2) with the interior of the conduit 14 above the valve 30 so that the instant pressure within the heat exchanger 5 will be transmitted to the cylinder 36 to act on the outer side of the piston 37. It is thus seen that the position of the poppet valve 34 with respect to its valve seat formed by the port 33, will be determined by the difference in pressure acting on opposite sides of the piston 37, and the valve is operative so that it will lift from its seat to allow flow through the heating system only when the pressure acting on the outer face of the piston 37, due to the pressure within the heat exchanger 5, exceeds the pressure acting on the inner face of the piston 37, due to the pressure existing within the exhaust manifold at a point adjacent the heat exchanger 5, plus the loading on the valve due to the spring 38. Under all conditions of operation in order that the valve 34 be open, it is necessary that the pressure within the conduit 14 above the valve 30 and within the heat exchanger 5 exceed the pressure existing within the exhaust manifold at the terminal end of the conduit 40 (Fig. 2), and as long as this condition prevails any leak in the heat exchanger 5 or connecting conduits within the exhaust manifold 4, will allow air under pressure within the heat exchanger to escape into the exhaust manifold, but will not allow a counter flow of exhaust gases from within the exhaust manifold 4 through the leak into the heating system to thereby contaminate the air passing through the heat exchanger 5 and serving as a heat transfer medium. In the event that a leak due to rusting or the like within those parts of the heating system contained within the exhaust manifold 4, and contacted by the exhaust gases, is of such a magnitude as to cause a serious drop in the pressure of the air delivered by the blower 10 to the heat exchanger 5, the differential in pressure on the opposite sides of the piston 37 of the control valve 30 will be insufficient to maintain the valve 34 in its open position and the spring 38 (Fig. 4) will urge the valve to the closed position and cut off all flow through the heating system and positively isolate the heat exchanger 5 from connection with the heat exchanger 20 (Fig. 2) and thus definitely prevent the possibility of any exhaust gases reaching the interior of the aircraft cabin or vehicle inclosure as the case might be. The flow of air through the heating system, and hence the control of the quantity of heat delivered by the heat exchanger or radiator 20, is controlled by the position of the butterfly gate valve 12 which controls the inlet of air into the blower 10 as previously described and the position of the valve 12, while determining the quantity flow through the heating system, will not materially affect the output pressure developed by the blower 10.

It is thus seen that by means of the inlet control for the blower 10 the heat transmitted by the heating system to the air within the cabin closure 2, may be controlled; and by means of the automatic control valve 30, responsive to the difference in pressure between the inside of the heat exchanger 5 and the pressure within the exhaust manifold exterior of the heat exchanger, the pressure within the heat exchanger is continuously maintained in excess of the pressure within the exhaust manifold, and thereby preventing the leakage of combustion products into the heating system and eliminating the possibility of asphyxiating the occupants of the vehicle; and, by means of the loading spring 38 of the valve 30 (Fig. 4), in the event of any serious leak within the portions of the heating system contacted by the exhaust gases, the heat exchanger 5 will be isolated from the remaining portions of the heating system and all flow of heat-transfer air through the heat exchanger 20 will be prevented, thus rendering the heating system inoperative upon the occurrence of a dangerous leak.

It is of course to be understood that the heat exchanger 5 (Fig. 2) need not necessarily be placed within the exhaust conduit but may also be made in the form of an annular housing surrounding a portion of the exhaust conduit in a manner well known in the art; and in heating systems for automobiles and the like where the exhaust conduit pressure is low the differential pressure-responsive control valve may be replaced by a simple spring-loaded check valve, the spring loading of which is made such that the valve will only open when the pressure in the first heat exchanger exceeds the pressure within the exhaust conduit to thereby control the heating system in the same manner as the above described differential pressure-responsive valve.

While a preferred embodiment of the invention has been disclosed, it is obvious that various changes may be made therein, for example, in the character of the differential pressure-responsive control valve and other elements of the heating system without departing from the scope of the invention as defined by the appended claims.

We claim:

1. In a heating system for vehicles propelled by internal combustion engines and having an engine-exhaust manifold; the combination with said exhaust manifold of a first heat exchanger operatively associated with said manifold to receive heat from the exhaust gases passing therethrough, a positive-pressure blower connected to said first heat exchanger to force air therethrough, a second heat exchanger connected to said first heat exchanger and adapted to transmit heat to the interior of the vehicle, a discharge conduit connecting said second heat exchanger and the atmosphere, and a flow control valve means interposed in the connection between said first and said second heat exchangers and operative to maintain the pressure of the air in said first heat exchanger at all times in excess of the pressure existing within said engine-exhaust manifold in the region adjacent said first heat exchanger to thereby prevent the entrance of exhaust gases into said heating system.

2. The structure as claimed in claim 1, in which said control valve means is operative upon a comparatively large drop in pressure within said first heat exchanger due to leakage and the like to cut-off the flow between said first and said second heat exchangers.

3. The structure as claimed in claim 1, in which said control valve means is responsive to the difference in pressure between the pressure in said first heat exchanger and the pressure in said engine exhaust manifold adjacent said first heat exchanger.

4. A vehicle heating system utilizing internal combustion engine exhaust gases as a source of heat, comprising a heat exchanger arranged within the vehicle space to be heated, a conduit communicating at one end with the atmosphere and connected at its other end with said heat exchanger, a portion of said conduit being arranged in heat exchange relation with the engine exhaust gases, a discharge conduit connected to said heat exchanger, means for causing a flow of air through the heating system, and differential pressure responsive valve means in said first named conduit between the portion thereof in heat exchange relation with the exhaust gases and said heat exchanger and operative to restrict the flow of air through the heating system to maintain the absolute pressure in said first named conduit between the inlet and said valve means greater than the absolute pressure of the exhaust gases adjacent the portion of said first named conduit in heat exchange relation with the said exhaust gases.

5. The structure as claimed in claim 4, including manually controlled valve means associated with said first named conduit to regulate the quantity flow of air into said heating system.

6. The structure as claimed in claim 4, in which said differential pressure responsive valve means includes a yielding means normally urging the valve in the closing direction and said pressure responsive means being operative to actuate the valve in the opening direction only when the said pressure difference exceeds a predetermined value.

WILLIAM E. HUFFMAN.
OTTO MORGENSEN, JR.